J. M. STEPHENS & W. A. ZEA.
FISH GRAB HOOK.
APPLICATION FILED MAY 9, 1910.
995,493.
Patented June 20, 1911.
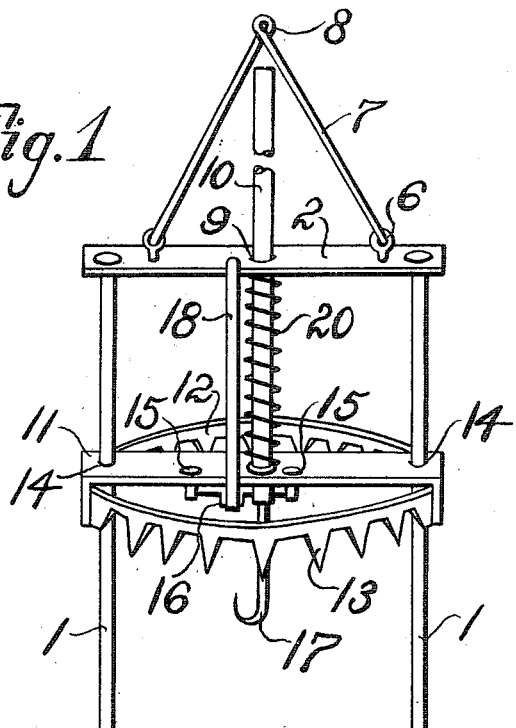
Fig.1
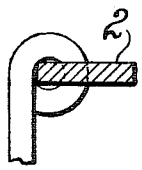
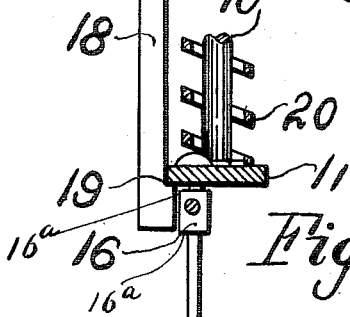
Fig.2
Fig.3
WITNESSES.
INVENTORS.

UNITED STATES PATENT OFFICE.

JASPER MARION STEPHENS AND WILLIAM A. ZEA, OF LAWTON, OKLAHOMA.

FISH GRAB-HOOK.

995,493.   Specification of Letters Patent.   Patented June 20, 1911.

Application filed May 9, 1910. Serial No. 560,373.

*To all whom it may concern:*

Be it known that we, JASPER M. STEPHENS and WILLIAM A. ZEA, residing at Lawton, in the county of Comanche and State of Oklahoma, have invented new and useful Improvements in Fish Grab-Hooks, of which the following is a specification.

This invention relates to improvements in grab hooks which may be used for catching either fish or animals, the invention consisting in the construction, combination and arrangement of devices, hereinafter described and claimed.

In the accompanying drawings: Figure 1 is a perspective view of a grab hook constructed in accordance with our invention, showing the same set. Fig. 2 is a detail sectional view showing the catch and the trip and coacting parts. Fig. 3 is a detail perspective view of the catch and trip also showing a portion of the cross bar of the upper jaw the stem or guide rod and the spring.

In the construction of our improved grab hook, we provide a frame which comprises a pair of vertical guide rods 1, and a cross bar 2, which connects the upper end of the said guide rods. Said guide rods are here shown as provided at their lower ends with hooks which engage and secure the lower jaw 3. This jaw is circular and is provided with upwardly extending spaced, impaling teeth 4. A netting 5 which may be made of wire or other suitable material closes the lower portion of the lower jaw. The cross bar 2 is provided near its ends with eyes 6, to which are connected suitable links 7 which serve for the attachment as at 8 of a suitable line, which may be employed in connection with the grab hook to lower the latter into the water when the trap is to be used for catching fish or marine animals.

The upper jaw 12 is circular and is provided on its lower side with spaced downwardly extending impaling teeth 13 which are co-incident with the spaces between the teeth of the lower jaw 3. A cross bar 11, extends across and has its ends secured to the upper jaw and is provided with openings 14, through which the guide rods 1 extend, the upper jaw being thereby slidably connected to the guide rods for vertical movement toward and from the lower jaw. A stem 10 extends upwardly from the center of the cross bar 11, to which its lower end is attached and the said stem extends through and is movable in a central opening 9 with which the cross bar 2 is provided. A coiled extensile spring 20 is disposed on the stem 10 and bears between the cross bars 2 and 11, its function being to force the upper jaw downwardly and close it against the lower jaw when the upper jaw is released.

A trip 16 is pivotally suspended from the cross bar 11 of the upper jaw, the bearings of its axis being indicated at 15, said trip having shoulders 16ª which extend above and below its axis. This trip is provided with a downwardly extending hook 17 to which a suitable bait may be attached. A catch 18 has its upper end pivotally connected to the cross bar 2, and is provided at its lower end with an inwardly extending shoulder 19, which may be engaged with the cross bar 11, of the upper jaw at a point to one side of and opposite the trip 16. This catch as will be understood, holds the upper jaw in raised, set position. When a fish or animal disturbs the bait on the hook 17, and the trip 16 is partly turned in either direction, one of its shoulders 16ª engages the lower, shouldered portion of the catch and acts as a cam to disengage the shoulder 19 of the catch from the cross bar 11, thereby releasing the upper jaw and the spring 20 then operates to move the upper jaw toward the lower jaw, and hence the fish or animal is caught and impaled between the jaws and cannot escape.

Having thus described our invention, we claim:—

1. The herein described grab hook comprising a frame having a fixed jaw provided with impaling teeth, a movable jaw connected to and guided by the frame and also provided with impaling teeth, a spring to operate the movable jaw, a catch pivotally connected to the frame and having a shoulder to engage an element of the movable jaw and hold the latter in set position against the tension of the spring, and a trip pivotally connected to the movable jaw and provided with a bait attaching device, the said trip being also provided with cam shoulders above and below its pivotal axis so that when the trip is moved in either direction on its pivot one of its cam shoulders engages the catch and positively moves the latter out of engagement with the movable jaw.

2. The herein described grab hook comprising a frame having vertical side bars, a cross bar connecting their upper ends and a lower jaw connecting their lower ends and provided on its upper side with impaling teeth, an upper jaw having impaling teeth on its lower side and provided with a cross member having openings through which the guide rods extend, said upper jaw being movable on the guide rods toward and from the lower jaw, a stem extending upwardly from the cross member of the upper jaw and slidably engaging the cross bar of the frame, a spring on the stem and bearing between the cross bar of the frame and the cross member of the upper jaw, a catch pivotally connected to the cross bar of the frame and having a shoulder to engage the cross member of the lower jaw and extend below the latter and a trip pivotally connected to the cross member of the upper jaw, the trip being provided with a downwardly extending bait attaching device and being also provided with cam shoulders extending above and below its pivotal axis so that when the trip is turned in either direction on its pivot one of its cam shoulders will engage the catch and positively disconnect the latter from the cross member of the upper jaw.

In testimony whereof we affix our signatures in presence of two witnesses.

JASPER MARION STEPHENS.
WILLIAM A. ZEA.

Witnesses:
 FRED W. REUVEN,
 CLAUD P. CRANDALL.

---

Copies of this patent may be obtained for five cents each, by addressing the "Commissioner of Patents, Washington, D. C."